(12) United States Patent
Kitano et al.

(10) Patent No.: US 8,541,510 B2
(45) Date of Patent: Sep. 24, 2013

(54) THERMOSETTING COMPOSITION

(75) Inventors: Hajime Kitano, Kunitachi (JP); Shuyou Akama, Saitama (JP)

(73) Assignee: Bridgestone Corporation, Tokyo (JP)

( * ) Notice: Subject to any disclaimer, the term of this patent is extended or adjusted under 35 U.S.C. 154(b) by 147 days.

(21) Appl. No.: 13/120,834

(22) PCT Filed: Sep. 25, 2009

(86) PCT No.: PCT/JP2009/066694
§ 371 (c)(1),
(2), (4) Date: May 26, 2011

(87) PCT Pub. No.: WO2010/035808
PCT Pub. Date: Apr. 1, 2010

(65) Prior Publication Data
US 2011/0224382 A1 Sep. 15, 2011

(30) Foreign Application Priority Data
Sep. 25, 2008 (JP) .................................. 2008-245922

(51) Int. Cl.
*C08L 9/06* (2006.01)
*C08C 19/20* (2006.01)
*C08F 236/10* (2006.01)

(52) U.S. Cl.
USPC ................... 525/332.9; 525/333.1; 525/345; 525/346; 525/350; 525/911

(58) Field of Classification Search
USPC ................... 525/332.9, 333.1, 345, 346, 350, 525/911
See application file for complete search history.

(56) References Cited

U.S. PATENT DOCUMENTS
4,083,834 A * 4/1978 Komatsu et al. .............. 525/346
2007/0106032 A1 5/2007 Yamada

FOREIGN PATENT DOCUMENTS

| CN | 1468875 A | 1/2004 |
|---|---|---|
| JP | 7-506606 A | 7/1995 |
| JP | 2000-129037 A | 5/2000 |
| JP | 2007-131665 A | 5/2007 |
| JP | 2007-138030 A | 6/2007 |
| JP | 2008-081713 A | 4/2008 |
| JP | 2009-086291 A | 4/2009 |
| WO | 98/18860 A1 | 5/1998 |

OTHER PUBLICATIONS

Machine translation of JP 2007-138030; pub. date: Jun. 2007.*
Machine translation of JP 2008-081713; pub. date: Apr. 2008.*
Machine translation of CN 1468875 (A); pub. date: Jan. 2004.*
PAJ Abstract of JP 63-020315; pub. date: Jan. 1988.*
Chinese Office Action dated Jul. 4, 2012 issued in Chinese Patent Application No. 200980147013.9.
Chinese Search Report dated Jun. 25, 2012 issued in Chinese Patent Application No. 200980147013.9.
"The Manual of Rubber Raw Material" 1996, pp. 280-281 and 286-287.
Chinese Office Action dated Dec. 13, 2012 issued in Chinese Patent Application No. 200980147013.9.

* cited by examiner

*Primary Examiner* — Fred M Teskin
(74) *Attorney, Agent, or Firm* — Sughrue Mion, PLLC

(57) ABSTRACT

This invention relates to a thermosetting composition having an excellent thermosetting property, and more particularly to a thermosetting composition comprising (A) a diene-based polymer having two or more unsaturated bonds, (B) a polythiol derived from a mercaptocarboxylic acid, and (c) a thermally radical-generating agent.

9 Claims, No Drawings

THERMOSETTING COMPOSITION

CROSS REFERENCE TO RELATED APPLICATIONS

This application is a National Stage of International Application No. PCT/JP2009/066694 filed Sep. 25, 2009, which claims priority from Japanese Patent Application No. 2008-245922 filed Sep. 25, 2008, the contents of all of which are incorporated herein by reference in their entirety.

TECHNICAL FIELD

This invention relates to a thermosetting composition, and more particularly to a thermosetting composition having an excellent thermosetting property.

RELATED ART

Nowadays, liquid thermosetting compositions are used in various applications, i.e. rollers such as development roller, charged roller, transfer roller and the like; blades such as development blade, cleaning blade and the like; gaskets, sealants for display, sealing material for buildings and so on. As such a liquid thermosetting composition is generally used a composition obtained by adding an organic peroxide to a liquid rubber such as liquid styrene-butadiene copolymer rubber, liquid polyisoprene rubber or the like.

For example, JP-A-2007-131665 discloses a liquid rubber composition comprising a liquid rubber such as liquid butadiene rubber, liquid isoprene rubber or the like, and an organic peroxide such as 1,1-di(t-hexylperoxy)-3,3,5-trimethylcyclohexane or the like. A cured product made from such a liquid rubber composition has a characteristic that compression permanent strain is low regardless of low hardness, and is preferable as a roller such as development roller, charged roller, transfer roller or the like, or a blade such as development blade, cleaning blade or the like.

PRIOR ART

Patent Document

Patent Document 1: JP-A-2007-131665

SUMMARY OF THE INVENTION

Problems to be Solved by the Invention

However, the inventors have made studies and found that in the composition comprising the liquid rubber such as diene-based polymer or the like and the organic peroxide, the thermosetting reaction is very slow or does not proceed quite since the reactivity of peroxy radical derived from the organic peroxide is low. For this end, an organic peroxide having a high reactivity should be used in combination with a diene-based polymer having a high reactivity, so that the degree of freedom in the selection of the materials is low. Also, in order to promote the thermosetting reaction, it is required to raise the temperature, so that there is a problem in view of the usability.

It is, therefore, an object of the invention to solve the above problems of the conventional technique and to provide a thermosetting composition having an excellent thermosetting property.

Means for Solving Problems

The inventors have made various studies in order to achieve the object and fond that (1) the thermosetting reaction becomes very fast by further adding a particular polythiol to a composition comprising a diene-based polymer and a thermally radical-generating agent and being vary slow in the thermosetting reaction, and (2) the proceeding of the thermosetting reaction is made possible by further adding a particular polythiol to a composition comprising a diene-based polymer and a thermally radical-generating agent and promoting no thermosetting reaction, and as a result the invention has been accomplished.

That is, the thermosetting composition according to the invention is characterized by comprising (A) a diene-based polymer having two or more unsaturated bonds, (B) a polythiol derived from mercaptocarboxylic acid, and (C) a thermally radical-generating agent.

In a preferable embodiment of the thermosetting composition according to the invention, the diene-based polymer (A) is liquid at 25° C. In this case, the diene-based polymer (A) is high in the compatibility with the polythiol (B) and the thermally radical-generating agent, so that the mixing becomes easy.

In another preferable embodiment of the thermosetting composition according to the invention, the diene-based polymer is a polymer synthesized from a diene-based monomer, or a copolymer synthesized from a diene-based monomer and maleic anhydride and/or styrene monomer.

In the thermosetting composition according to the invention, the diene-based polymer (A) is preferable to have a number average molecular weight (Mn) of 1500-40000. At this moment, as the diene-based polymer (A) is preferable a liquid styrene-butadiene copolymer having a bound styrene content of 15-90 mass % and a vinyl bond content in butadiene portion of 20-90%. Also, the liquid styrene-butadiene copolymer is further preferable to have a hydroxy group(s) in its terminal or both terminals. In the invention, the number average molecular weight (Mn) is a value converted to polystyrene as measured by a gel permeation chromatography (GPC), and the bound styrene content is a value measured by a nuclear magnetic resonance spectroscopy, and the vinyl bond content is a value measured by a nuclear magnetic resonance spectroscopy (NMR).

As the diene-based polymer (A) is also preferable a liquid polyisoprene having a number average molecular weight (Mn) of 1500-40000 and a hydroxy group(s) in its terminal or both terminals.

As the polythiol in the thermosetting composition according to the invention are preferable tetraethylene glycol bis(3-mercaptopropionate), trimethylolpropane tris(3-mercaptopropionate), tris[(3-mercaptopropionyloxy)-ethyl] isocyanurate, pentaerythritol tetrakis(3-mercaptopropionate), dipentaerythritol hexakis(3-mercaptopropionate), 1,4-bis(3-mercaptobutylyloxy)butane, pentaerythritol tetrakis(3-mercaptobutyrate) and 1,3,5-tris(3-mercaptobutyloxyethyl)-1,3,5-triazine-2,4,6(1H, 3H, 5H)-trion. in this case, the compatibility among the diene-based polymer (A), polythiol (B) and the thermally radical-generating agent is high, so that the composition having stable performances can be obtained uniformly. Further, a higher curing property can be developed by using the above polythiol.

As the thermally radical-generating agent in the thermosetting composition according to the invention are preferable an organic peroxide and an azobis-based compound.

Also, the thermosetting composition according to the invention is preferable to be liquid at 25° C. In this case, there is no need of heating or milling operation and the processing becomes easy, and it is possible to combine various liquid polymers and to extrude from a fine syringe, so that it is applicable to fine processing for a gasket member, a sealant material for display or the like.

Effect of the Invention

According to the invention, the thermosetting reaction can be made very fast by further adding the particular polythiol to the composition comprising the diene-based polymer and the thermally radical-generating agent and being very slow in the thermosetting reaction. Also, according to the invention, the proceeding of the thermosetting reaction can be made possible by further adding the particular polythiol to the composition comprising the diene-based polymer and the thermally radical-generating agent and promoting no thermosetting reaction.

BEST MODE FOR CARRYING OUT THE INVENTION

The invention will be described in detail below. The thermosetting composition according to the invention is characterized by comprising (A) a diene-based polymer having two or more unsaturated bonds, (B) a polythiol derived from mercaptocarboxylic acid, and (C) a thermally radical-generating agent. If necessary, the thermosetting composition may contain a commonly usable additive(s).

The inventors have examined the composition comprising a variety of diene-based polymers (A) and a variety of thermally radical-generating agents (C), and found that the thermosetting property differs in accordance with each combination of the diene-based polymer (A) and the thermally radical-generating agent and the thermosetting reaction is very slow as a whole, and there are some combinations promoting no thermosetting reaction. This is considered due to the fact that the reactivity of radical from the thermally radical-generating agent is low.

On the contrary, the inventors have made further studies and found that by further adding a polythiol derived from mercaptocarboxylic acid to the composition comprising the diene-based polymer (A) and the thermally radical-generating agent (C) is largely improved the thermosetting property of the composition and that the thermosetting reaction rate in the system promoting the thermosetting reaction only by the diene-based polymer (A) and the thermally radical-generating agent (C) is largely improved by the addition of the polythiol (B) and also that the promoting of the thermosetting reaction can be made possible by the addition of the polythiol (B) in the system promoting no thermosetting reaction only through the diene-based polymer (A) and the thermally radical-generating agent (C). This is considered due to the fact that the radical from the thermally radical-generating agent (C) is acted to the polythiol (B) to generate a thiyl radical, which can be added to the unsaturated bond of the diene-based polymer (A) to promote the curing (crosslinking) reaction because the reactivity of the thiyl radical is higher than the reactivity of the radical from the thermally radical-generating agent (C).

Therefore, the thermosetting composition according to the invention is not required to be cured at a higher temperature and is possible to be cured at a relatively low temperature because the curing rate is very high. Also, it is possible to combine a variety of diene-based polymers (A) with thermally radical-generating agents (C), whereby the degree of freedom for the selection of materials can be largely improved to design a thermosetting composition suitable for applications.

The diene-based polymer (A) used in the thermosetting composition of the invention has two or more unsaturated bonds. As the unsaturated bond are mentioned carbon-carbon unsaturated bonds such as carbon-carbon double bond, carbon-carbon triple bond and so on.

As the diene-based polymer (A) can be used various polymers, which concretely include natural rubber, styrene-butadiene copolymer, polyisoprene, polybutadiene, butadiene-isoprene copolymer, isobutylene-isoprene copolymer, butadiene-acrylonitrile copolymer, styrene-isoprene copolymer. polychloroprene and the like. The terminal of these diene-based polymers may be modified or may not be modified. Moreover, these diene-based polymers may be used alone or in a combination of two or more.

The diene-based polymer (A) is preferable to be liquid at 25° C. (room temperature). When the diene-based polymer (A) as a main component of the thermosetting composition is liquid at 25° C., the mixing of various components becomes easy.

The production method of the diene-based polymer (A) is not particularly limited, and can be obtained, for example, by polymerizing diene-based monomer such as 1,3-butadiene, isoprene, chloroprene, 1,3-pentadiene, 2,3-dimethylbutadiene or the like, or by copolymerizing such a diene-based monomer with another monomer such as maleic anhydride, styrene or the like. In the (co)polymerization, a lithium series initiator can be used and further a randomizer or the like may be used, if necessary. When the diene-based polymer is produced by an anion polymerization using the lithium series initiator, it is also possible to optionally modify a living terminal of the polymer chain with various modifying agents. For example, the diene-based polymer having hydroxy group(s) in its terminal or both terminals can be obtained by using an alkylene oxide such as ethylene oxide, propylene oxide or the like as the modifying agent.

The diene-based polymer (A) is preferable to have a number average molecular weight (Mn) of 1500-40000. When the number average molecular weight (Mn) of the diene-based polymer (A) used is not less than 1500, the content of unsaturated bond is no problem and the properties such as strength, elongation and the like are good, while when it is not more than 40000, the compatibility with polythiol or the processability in the molding is good.

As the diene-based polymer (A) is preferable a liquid styrene-butadiene copolymer having a bound styrene content of 15-90 mass % and a vinyl bond content in butadiene portion of 20-90%. By using the liquid styrene-butadiene copolymer having the bound styrene content and vinyl bond content in butadiene portion of the above ranges are improved the curing property and the compatibility with polythiol.

Also, the liquid styrene-butadiene copolymer is preferable to have hydroxy group(s) in its terminal or both terminals. When the liquid styrene-butadiene copolymer having hydroxy group(s) in its terminal or both terminals is used as the diene-based polymer (A), the compatibility with polythiol is further improved.

As the diene-based polymer (A) is preferable a liquid polyisoprene having hydroxy group(s) in its terminal or both terminals. By using the liquid polyisoprene having hydroxy group(s) in its terminal or both terminals is improved the compatibility with polythiol.

The polythiol used in the thermosetting composition according to the invention is a polythiol derived from mercaptocarboxylic acid, preferably a polythiol derived from 3-mercaptopropionic acid. The polythiol has preferably a plurality of mercaptoacyloxy groups in its molecule, more preferably 2-6 groups. As the mercaptoacyloxy group are concretely mentioned 3-mercaptopropionyloxy group [HS—(CH$_2$)$_2$—COO—], 3-mercaptobutyloxy group [HS—CH(CH$_3$)—CH$_2$—COO—] and the like, and 3-mercaptopropionyloxy group is preferable. The polythiol derived from the mercaptocarboxylic acid (B) generates thiyl radical through radical derived from the thermally radical-generating agent (C). The thiyl radical is added to the unsaturated bond of the diene-based polymer (A) to promote the curing (crosslinking) reaction.

As the polythiol (B) are concretely preferable tetraethylene glycol bis(3-mercaptopropionate) represented by the following formula (I), trimethylolpropane tris(3-mercaptopropionate) represented by the following formula (II), tris[(3-mercaptopropionyloxy)-ethyl]isocyanurate represented by the following formula (III), pentaerythritol tetrakis(3-mercaptopropionate) represented by the following formula (IV), dipentaerythritol hexakis(3-mercaptopropionate) represented by the following fromula formula (V), 1,4-bis(3-mercaptobutylyloxy)butane represented by the following formula (VI), pentaerythritol tetrakis(3-mercaptobutyrate) represented by the following formula (VII) and 1,3,5-tris(3-mercaptobutyloxyethyl)-1,3,5-triazine-2,4,6(1H,3H,5H)-trion represented by the following formula (VIII).

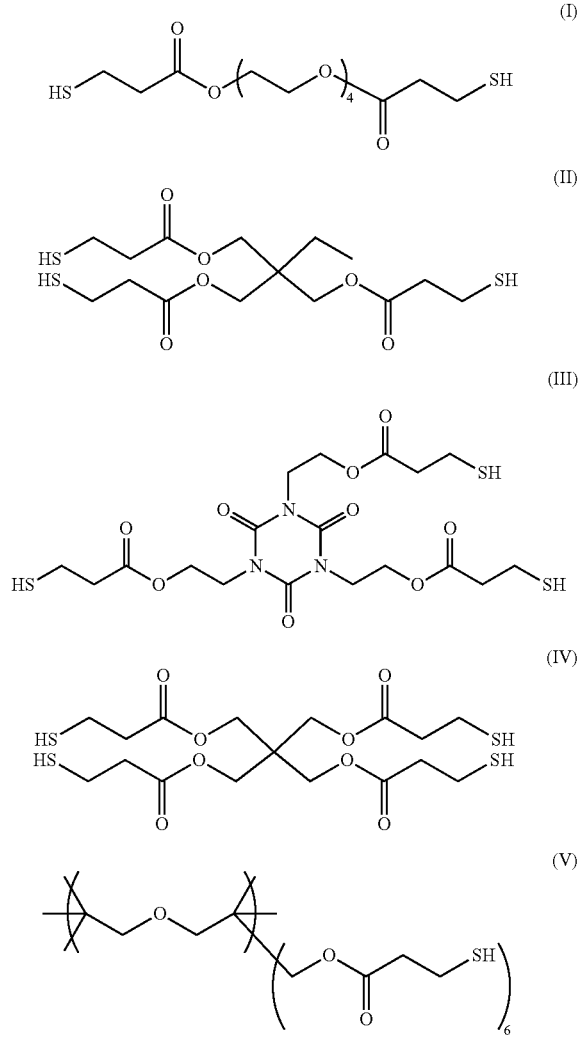

The polythiol (B) can provide a uniform composition having stable performances because the compatibility with the diene-based polymer (A) is high. Moreover, these polythiols (B) may be used alone or in a combination of two or more.

The amount of the polythiol compounded is not particularly limited, but is preferably 0.5-50 parts by mass, further preferably 2-40 parts by mass, more preferably 5-30 parts by mass based on 100 parts by mass of the diene-based polymer (A). When the amount of the polythiol (B) compounded is not less than 5 parts by mass, the thermosetting property of the composition can be improved sufficiently, while when it is not more than 30 parts by mass, the good compatibility with the liquid rubber can be maintained.

The radical-generating agent used in the thermosetting composition of the invention generates radical through heat and acts to start (promote) the thermosetting of the composition. As the thermally radial-generating agent (C) are preferable an organic peroxide and an azobis series compound. These thermally radical-generating agents (C) may be used alone or in a combination of two or more.

As the organic peroxide are mentioned, for example, 1,1-di(t-hexylperoxy)-3,3,5-trimethylcyclohexane, t-amylperoxy-2-ethylhexanoate, di(2-t-butylperoxyisopropyl)benzene, benzoyl peroxide, 1,1'-di(t-butylperoxy)cyclohexane, di(3,5,5-trimethylhexanoyl)peroxide, t-butylperoxyneodecanoate, t-hexylperoxyneodecanoate, dicumylperoxide and the like.

As the azobis series compound are mentioned, for example, 2,2'-azobis(2-methylpropyonitrile), 2,2'-azobis(2-methylbutylonitrile), 2,2'-azobis(2,4-dimethylvaleronitrile), 2,2'-azobis(4-methoxy-2,4-dimethylvaleronitrile), 2-phenylazo-4-methoxy-2,4-dimethylvaleronitrile, dimethyl-2,2'-azobis(2-methylpropionate) and the like.

The amount of the radical-generating agent (C) compounded is not particularly limited, but is preferably 0.05-30 parts by mass, further preferably 0.2-20 parts by mass, more preferably 0.5-15 parts by mass. When the amount of the radical-generating agent (C) compounded is not less than 0.05 part by mass, the thermosetting reaction of the composition can be started, while when it is not more than 30 parts by mass, gas generation from the radical-generating agent, bleed-out of residual radical-generating agent and out gas generation can be suppressed.

The thermosetting composition according to the invention is preferable to be liquid at 25° C. When the composition is liquid, the processing is easy without requiring the heating or milling operation, and also it is possible to combine with a variety of liquid monomers. Furthermore, it is possible to extrude through a fine syringe because of the liquid, which is applicable to fine processing for gasket members, sealing material for display and the like.

The thermosetting composition according to the invention can be used in various applications, which have been used in the conventional thermosetting compositions, because the thermosetting property is high. Especially, the thermosetting composition according to the invention is useful in rollers such as development roller, charged roller, transfer roller and the like used in printers, copy machines and the like; blades such as development blade, cleaning blade and the like; gasket members, sealant materials for display, sealing material for buildings and so on.

EXAMPLES

The invention will be described in detail with reference to examples. The invention is not limited to the following examples.

(Synthetic Example of SB Copolymer A)

To sufficiently dehydrated and purified cyclohexane solvent is added 1 mol of 1,3-(diisopropenyl)benzene and thereafter 2 mol of triethylamine and 2 mol of sec-butyllithium are successively added, which are stirred at 50° C. for 2 hours to prepare a dilithium series initiator.

Into a polymerization reactor of 7 liters replaced with argon are charged 1.5 kg of dehydrated and purified cyclohexane, 1.65 kg of a solution of 22.9 mass % of 1,3-butadiene monomer in hexane, 1.00 kg of a solution of 20.0 mass % of styrene monomer in cyclohexane and 200 ml of a solution of 1.15 mol/l of 2,2-bis(tetrahydrofuryl)propane in hexane, and thereafter 230 ml of 0.5 mol/l of the above dilithium series initiator to start polymerization.

Polymerization is conducted for 1.5 hours while raising the temperature of the polymerization reactor to 50° C., and thereafter 254 ml of a solution of 1 mol/l of ethylene oxide in cyclohexane is added and stirring is conducted further for 2 hours and then 50 ml of isopropyl alcohol is added. A solution of resulting polymer in hexane is precipitated in isopropyl alcohol and dried sufficiently to obtain a liquid SBR polyol as SBR having hydroxy groups in its both terminals.

The thus obtained liquid SBR polyol is a styrene-butadiene copolymer A having hydroxyl groups at both terminals in which the bound styrene content is 35 mass % and the vinyl bond content in butadiene portion is 65%. Also, the number average molecular weight is 5200, and the weight average molecular weight is 6700, and the molecular weight distribution is 1.28.

(Synthetic Example of SB copolymer B)

To sufficiently dehydrated and purified cyclohexane solvent is added 1 mol of 1,3-(diisopropenyl)benzene and thereafter 2 mol of triethylamine and 2 mol of sec-butyllithium are successively added, which are stirred at 50° C. for 2 hours to prepare a dilithium series initiator.

Into a polymerization reactor of 7 liters replaced with argon are charged 1.45 kg of dehydrated and purified cyclohexane, 1.15 kg of a solution of 22.9 mass % of 1,3-butadiene monomer in hexane, 1.65 kg of a solution of 20.0 mass % of styrene monomer in cyclohexane and 200 ml of a solution of 1.15 mol/l of 2,2-bis(tetrahydrofuryl)propane in hexane, and thereafter 230 ml of 0.5 mol/l of the above dilithium series initiator to start polymerization.

Polymerization is conducted for 1.5 hours while raising the temperature of the polymerization reactor to 50° C., and thereafter 254 ml of a solution of 1 mol/l of ethylene oxide in cyclohexane is added and stirring is conducted further for 2 hours and then 50 ml of isopropyl alcohol is added. A solution of resulting polymer in hexane is precipitated in isopropyl alcohol and dried sufficiently to obtain a liquid SBR polyol as SBR having hydroxy groups in its both terminals.

The thus obtained liquid SBR polyol is a styrene-butadiene copolymer B having hydroxyl groups at both terminals in which the bound styrene content is 55 mass % and the vinyl bond content in butadiene portion is 65%. Also, the number average molecular weight is 4000, and the weight average molecular weight is 4800, and the molecular weight distribution is 1.20.

(Synthetic Example of SB Copolymer C)

To sufficiently dehydrated and purified cyclohexane solvent is added 1 mol of 1,3-(diisopropenyl)benzene and thereafter 2 mol of triethylamine and 2 mol of sec-butyllithium are successively added, which are stirred at 50° C. for 2 hours to prepare a dilithium series initiator.

Into a polymerization reactor of 7 liters replaced with argon are charged 1.45 kg of dehydrated and purified cyclohexane, 2.00 kg of a solution of 22.9 mass % of 1,3-butadiene monomer in hexane, 0.765 kg of a solution of 20.0 mass % of styrene monomer in cyclohexane and 200 ml of a solution of 1.15 mol/l of 2,2-bis(tetrahydrofuryl)propane in hexane, and thereafter 224 ml of 0.5 mol/l of the above dilithium series initiator to start polymerization.

Polymerization is conducted for 1.5 hours while raising the temperature of the polymerization reactor to 50° C., and thereafter 254 ml of a solution of 1 mol/l of ethylene oxide in cyclohexane is added and stirring is conducted further for 2 hours and then 50 ml of isopropyl alcohol is added. A solution of resulting polymer in hexane is precipitated in isopropyl alcohol and dried sufficiently to obtain a liquid SBR polyol as SBR having hydroxy groups in its both terminals.

The thus obtained liquid SBR polyol is a styrene-butadiene copolymer C having hydroxyl groups at both terminals in which the bound styrene content is 23 mass % and the vinyl bond content in butadiene portion is 65%. Also, the number average molecular weight is 4900, and the weight average molecular weight is 6200, and the molecular weight distribution is 1.26.

<Preparation and Evaluation of Thermosetting Composition>

A thermosetting composition is prepared according to a compounding recipe shown in Tables 1-3 using the above synthesized styrene-butadiene copolymers or a commercially available diene-based polymer, and the curing property and compatibility are evaluated by the following methods.

(Evaluation of Curing Property)

A torque produced from the composition is measured at 150° C. or 170° C. using a curastometer to determine a time (T90) reaching up to a 90% torque of maximum torque. In this case, the curing property of the composition is visually observed wherein a cured case is ○ and a somewhat cured case is Δ and a non-cured case is X. The results are shown in Tables 1-3.

(Evaluation of Compatibility)

The composition obtained after the mixing of the components is evaluated visually. The evaluation standard is shown below.

○: transparent
○Δ: somewhat white turbidity
Δ: white turbidity
ΔX: slight phase separation
X: complete phase separation or no dissolution

TABLE 1

| | | | | Comparative Example 1 | Comparative Example 2 | Example 1 | Example 2 | Example 3 | Comparative Example 3 | Comparative Example 4 | Example 4 | Comparative Example 5 | Example 5 |
|---|---|---|---|---|---|---|---|---|---|---|---|---|---|
| Compounding recipe | Liquid rubber (SBR) | Ricon 100 *1 | part by mass | 100 | 100 | 100 | 100 | 100 | 100 | 100 | 100 | 100 | 100 |
| | | Ricon 181 *2 | | — | — | — | — | — | — | — | — | — | — |
| | | SB copolymer A *3 | | — | — | — | — | — | — | — | — | — | — |
| | | SB copolymer B *4 | | — | — | — | — | — | — | — | — | — | — |
| | | SB copolymer C *5 | | — | — | — | — | — | — | — | — | — | — |
| | Liquid rubber (IR) | poly-IP *6 | | — | — | — | — | — | — | — | — | — | — |
| | Polythiol from mercapto-carboxylic acid | TMMP *7 | | — | — | 20 | — | — | — | — | — | — | — |
| | | PEMP *8 | | — | 20 | — | 20 | — | — | — | 20 | — | 20 |
| | | DPMP *9 | | — | — | — | — | 20 | — | — | — | — | — |
| | Polythiol from non-mercapto-carboxylic acid | 2,4,6-tri-mercapto-s-triazine *10 | | — | — | — | — | — | — | 20 | — | — | — |
| | Peroxide series radical-generating agent | perhexa-TMH *11 | | — | 10 | — | 10 | 10 | 10 | — | — | — | — |
| | | Trigonox 121 *12 | | — | — | — | — | — | — | 6.4 | 6.4 | 6.4 | — | — |
| | | perbutyl P *13 | | — | — | — | — | — | — | — | — | 9.4 | 9.4 |
| | Azobis series radical-generating agent | AIBN *14 | | — | — | — | — | — | — | — | — | — | — |
| Evaluation of curing property | curasto condition | temperature | ° C. | 170 | 170 | 170 | 170 | 170 | 170 | 170 | 170 | 170 | 170 |
| | Results | presence or absence of curing | | ○ | Δ | ○ | ○ | ○ | X | X | ○ | ○ | ○ |
| | | T90 | min. | 17.52 | 26 | 7.57 | 4.77 | 6.45 | — | — | 3.1 | 12.825 | 7.955 |
| Evaluation of compatibility | | | | ○ | ○Δ | ○Δ | ○Δ | ○Δ | ○ | X | ○Δ | ○ | ○Δ |

TABLE 2

| | | | | Comparative Example 6 | Example 6 | Comparative Example 7 | Example 7 | Comparative Example 8 | Example 8 | Comparative Example 9 | Example 9 |
|---|---|---|---|---|---|---|---|---|---|---|---|
| Compounding recipe | Liquid rubber (SBR) | Ricon 100 *1 | part by mass | — | — | — | — | — | — | — | — |
| | | Ricon 181 *2 | | 100 | 100 | — | — | — | — | — | — |
| | | SB copolymer A *3 | | — | — | 100 | 100 | — | — | — | — |
| | | SB copolymer B *4 | | — | — | — | — | 100 | 100 | — | — |

TABLE 2-continued

|  |  |  | | Comparative Example 6 | Example 6 | Comparative Example 7 | Example 7 | Comparative Example 8 | Example 8 | Comparative Example 9 | Example 9 |
|---|---|---|---|---|---|---|---|---|---|---|---|
|  |  | SB copolymer C *5 | | — | — | — | — | — | — | 100 | 100 |
|  | Liquid rubber (IR) | poly-IP *6 | | — | — | — | — | — | — | — | — |
|  | Polythiol from mercaptocarboxylic acid | TMMP *7 | | — | — | — | — | — | — | — | — |
|  |  | PEMP *8 | | — | 20 | — | 20 | — | 20 | — | 20 |
|  |  | DPMP *9 | | — | — | — | — | — | — | — | — |
|  | Polythiol from non-mercaptocarboxylic acid | 2,4,6-tri-mercapto-s-triazine *10 | | — | — | — | — | — | — | — | — |
|  | Peroxide series radical-generating agent | perhexa-TMH *11 | | 10 | 10 | — | — | 10 | 10 | 10 | 10 |
|  |  | Trigonox 121 *12 | | — | — | 1 | 1 | — | — | — | — |
|  |  | perbutyl P *13 | | — | — | — | — | — | — | — | — |
|  | Azobis series radical-generating agent | AIBN *14 | | — | — | — | — | — | — | — | — |
| Evaluation of curing property | curasto condition Results | temperature | °C. | 170 | 170 | 150 | 150 | 170 | 120 | 170 | 170 |
|  |  | presence or absence of curing | | ◯ | ◯ | X | ◯ | ◯ | ◯ | ◯ | ◯ |
|  |  | T90 | min. | 12.05 | 2.37 | — | 2.55 | 10.395 | 0.6 | 14.885 | 4.625 |
| Evaluation of compatibility |  |  | | ◯ | ◯Δ | ◯ | ◯ | ◯ | ◯ | ◯ | ◯ |

TABLE 3

|  |  |  |  | Comparative Example 10 | Comparative Example 11 | Example 10 | Comparative Example 12 | Example 11 |
|---|---|---|---|---|---|---|---|---|
| Compounding recipe | Liquid rubber (SBR) | Ricon 100 *1 | part by mass | 100 | 100 | 100 | — | — |
|  |  | Ricon 181 *2 | | — | — | — | — | — |
|  |  | SB copolymer A *3 | | — | — | — | — | — |
|  |  | SB copolymer B *4 | | — | — | — | — | — |
|  |  | SB copolymer C *5 | | — | — | — | — | — |
|  | Liquid rubber (IR) | poly-IP *6 | | — | — | — | 100 | 100 |
|  | Polythiol from mercaptocarboxylic acid | TMMP *7 | | — | — | — | — | — |
|  |  | PEMP *8 | | — | — | 20 | — | 20 |
|  |  | DPMP *9 | | — | — | — | — | — |
|  | Polythiol from non-mercaptocarboxylic acid | 2,4,6-trimercapto-s-triazine *10 | | — | 20 | — | — | — |
|  | Peroxide series radical-generating agent | perhexa-TMH *11 | | — | — | — | 10 | 10 |
|  |  | Trigonox 121 *12 | | — | — | — | — | — |
|  |  | perbutyl P *13 | | — | — | — | — | — |
|  | Azobis series radical-generating agent | AIBN *14 | | 4.6 | 4.6 | 4.6 | — | — |
| Evaluation of curing property | curasto condition Results | temperature | °C. | 170 | 170 | 170 | 170 | 170 |
|  |  | presence or absence of curing | | X | X | ◯ | X | ◯ |
|  |  | T90 | min. | — | — | 15.66 | — | 28 |
| Evaluation of compatibility |  |  | | ◯ | X | ◯Δ | ◯ | Δ |

*1 Ricon 100, made by Sartomer Co., Ltd. number average molecular weight = 4200, bound styrene content = 25 mass %, vinyl bond content in butadiene portion = 60%, terminal functional group: none, liquid at 25° C.
*2 Ricon 181, made by Sartomer Co., Ltd. number average molecular weight = 3200, bound styrene content = 25 mass %, vinyl bond content in butadiene portion = 30%, terminal functional group: none, liquid at 25° C.
*3 SB copolymer A, synthesized by the above method, number average molecular weight = 5200, bound styrene content = 35 mass %, vinyl bond content in butadiene portion = 65%, terminal functional group: OH, liquid at 25° C.
*4 SB copolymer B, synthesized by the above method, number average molecular weight = 4000, bound styrene content = 55 mass %, vinyl bond content in butadiene portion = 65%, terminal functional group: OH, liquid at 25° C.
*5 SB copolymer C, synthesized by the above method, number average molecular weight = 4900, bound styrene content = 23 mass %, vinyl bond content in butadiene portion = 65%, terminal functional group: OH, liquid at 25° C.
*6 Poly-IP, made by Idemitsu Kosan Co., Ltd. number average molecular weight = 2500, terminal functional group: OH, liquid at 25° C.
*7 TMMP, trimethylolpropane tris(3-mercaptopropionate)
*8 PEMP, pentaerythritol tetrakis(3-mercaptopropionate)
*9 DPMP, dipentaerythritol hexakis(3-mercaptopropionate)
*10 2,4,6-trimercapto-s-triazine, made by Sankyo Kasei Co., Ltd.
*11 perhexa TMH, made by NOF Corporation, 1,1-di(t-hexylperoxy)-3,5,5-trimethylcyclohexane
*12 Trigonox 121, made by Akzo Nobel N.V.
*13 perbutyl P, made by NOF Corporation, di(2-t-butylperoxyisopropyl)benzene
*14 AIBN, made by Wako Pure Chemical Industries, Ltd., 2,2'-azobis(2-methylpropionitrile)

As seen from the results of Comparative Examples 1 and 2 and Example 1 in Table 1, the curing rate is very faster in the composition of Example 1 comprising the diene-based polymer (A), polythiol (B) and thermally radical-generating agent (C) rather than the composition of Comparative Example 1 comprising the diene-based polymer (A) and thermally radical-generating agent (C) but containing no polythiol (B) or the composition of Comparative Example 2 comprising the diene-based polymer (A) and polythiol (B) but containing no thermally radical-generating agent (C).

Also, it can be seen from the results of Examples 2 and 3 that the curing rate can be increased by using various polythiols (B).

Furthermore, it can be seen from the results of Comparative Example 3 and Example 4 that the promoting of the thermosetting reaction can be made possible by adding the polythiol (B) to the composition comprising the diene-based polymer (A) and thermally radical-generating agent (C) but promoting no thermosetting reaction. From the result of Comparative Example 4, it can be seen that the thermosetting reaction is not promoted even if the compound not derived from mercaptocarboxylic acid is compounded as a polythiol.

Further, it can be seen from the results of Comparative Example 5 and Example 5 that when various organic peroxides are used, the curing rate is increased by the addition of the polythiol (B).

From the results between Comparative Example 6 and Example 6, between Comparative Example 8 and Example 8, and between Comparative Example 9 and Example 9 in Table 2, it can be seen that the curing rate is increased by adding the polythiol (B) and thermally radical-generating agent (C) even when various polymers are used as a diene-based polymer (A).

From the results of Comparative Example 7 and Example 7, it can be seen that no curing is caused in the combination of the diene-based polymer (A) and thermally radical-generating agent (C) (Comparative Example 7) but the thermosetting becomes possible by adding the polythiol (B) (Example 7).

As shown from Comparative Example 10 and Example 10 in Table 3, when the azobis series compound is used as the thermally radical-generating agent (C), the composition of Comparative Example 10 comprising no polythiol (B) is not cured, while the composition of Example 10 added with the polythiol (B) is cured, from which it can be seen that the addition of the polythiol (B) is effective on a variety of thermally radical-generating agents (C). Moreover, it can be also seen from the result of Comparative Example 11 that the thermosetting reaction is not promoted even if the compound not derived from mercaptocarboxylic acid is compounded as the polythiol.

As shown in Comparative Example 12 and Example 11, when polyisoprene is used as the diene-based polymer (A), the composition of Comparative Example 12 containing no polythiol (B) is not cured, while the composition of Example 11 added with the polythiol (B) is cured, from which it can be seen that the addition of the polythiol (B) is effective on a variety of diene-based polymers (A).

From the above results, it is confirmed that the curing property is largely improved in the composition according to the invention comprising the diene-based polymer (A), polythiol (B) and thermally radical-generating agent (C) as compared with the composition not containing the polythiol (B) and/or thermally radical-generating agent (C).

The invention claimed is:

1. A thermosetting composition comprising (A) a diene-based polymer having two or more unsaturated bonds, (B) a polythiol derived from mercaptocarboxylic acid and (C) a thermally radical-generating agent, wherein said diene-based polymer (A) is a liquid styrene-butadiene copolymer having a bound styrene content of 15-90 mass % and a vinyl bond content in butadiene portion of 20-90% or a liquid polyisoprene having hydroxy group(s) in one terminal or both terminals, and
   said thermally radical-generating agent (C) is at least one selected from the group consisting of organic peroxides and azobis series compounds.

2. A thermosetting composition according to claim 1, wherein said diene-based polymer (A) is a liquid at 25° C.

3. A thermosetting composition according to claim 1, wherein said diene-based polymer is a polymer synthesized from a diene-based monomer, or a copolymer synthesized from a diene-based monomer and maleic anhydride and/or styrene monomer.

4. A thermosetting composition according to claim 1, wherein said diene-based polymer (A) has a number average molecular weight of 1500-40000.

5. A thermosetting composition according to claim 1, wherein said diene-based polymer (A) is a liquid styrene-butadiene copolymer having a bound styrene content of 15-90 mass % and a vinyl bond content in butadiene portion of 20-90%.

6. A thermosetting composition according to claim 5, wherein said liquid styrene-butadiene copolymer has hydroxy group(s) in one terminal or both terminals.

7. A thermosetting composition according to claim 1, wherein said diene-based polymer (A) is a liquid polyisoprene having hydroxy group(s) in one terminal or both terminals.

8. A thermosetting composition according to claim 1, wherein said polythiol (B) is at least one selected from the group consisting of tetraethylene glycol bis(3-mercaptopropionate), trimethylolpropane tris(3-mercaptopropionate), tris[(3-mercaptopropionyloxy)-ethyl]isocyanurate, pentaerythritol tetrakis(3-mercaptopropionate), dipentaerythritol hexakis(3-mercaptopropionate), 1,4-bis(3-mercaptobutylyloxy)butane, pentaerythritol tetrakis(3-mercaptobutyrate) and 1,3,5-tris(3-mercaptobutyloxyethyl)-1,3,5-triazine-2,4,6 (1H,3H,5H)-trion.

9. A thermosetting composition according to claim 1, wherein the composition is liquid at 25° C.

* * * * *